United States Patent [19]
Blau et al.

[11] 3,763,704
[45] Oct. 9, 1973

[54] APPARATUS FOR CONTINUOUSLY MEASURING THE TEMPERATURE OF MOLTEN METAL

[76] Inventors: Philip Blau, 1740 Elderslee Rd., Pittsburgh, Pa. 15227; George J. Zellner, 326 King of Arms Dr., Greensburgh, Pa. 15601

[22] Filed: Apr. 28, 1972

[21] Appl. No.: 248,742

[52] U.S. Cl............... 73/359, 73/343 R, 136/234, 266/34 LM
[51] Int. Cl............ G01k 7/08, G01k 1/14
[58] Field of Search............ 73/359, 343 R, 339 R; 266/34 LM; 136/234

[56] References Cited
UNITED STATES PATENTS
3,610,601 10/1971 Bishop ........................... 73/359
1,979,085 10/1934 Vollrath .......................... 73/359
2,463,427 3/1949 Richards .......................... 73/359

*Primary Examiner*—Richard C. Queisser
*Assistant Examiner*—Denis E. Corr
*Attorney*—Brown, Murray, Flick & Peckham

[57] ABSTRACT

A longitudinally movable thermocouple cable contains a pair of laterally spaced thermocouple wires having exposed ends at the leading end of the cable. The cable is fed forward into a body of molten metal by variable speed means to generate an electric signal in the cable. The speed of the feeding means is controlled by servo means responsive to this electric signal to cause the feeding means to feed the cable into the metal at a rate that will substantially equal the rate at which the leading end of the cable is consumed by the molten metal. The electric signal also operates means that continuously registers the temperature of the metal.

10 Claims, 5 Drawing Figures

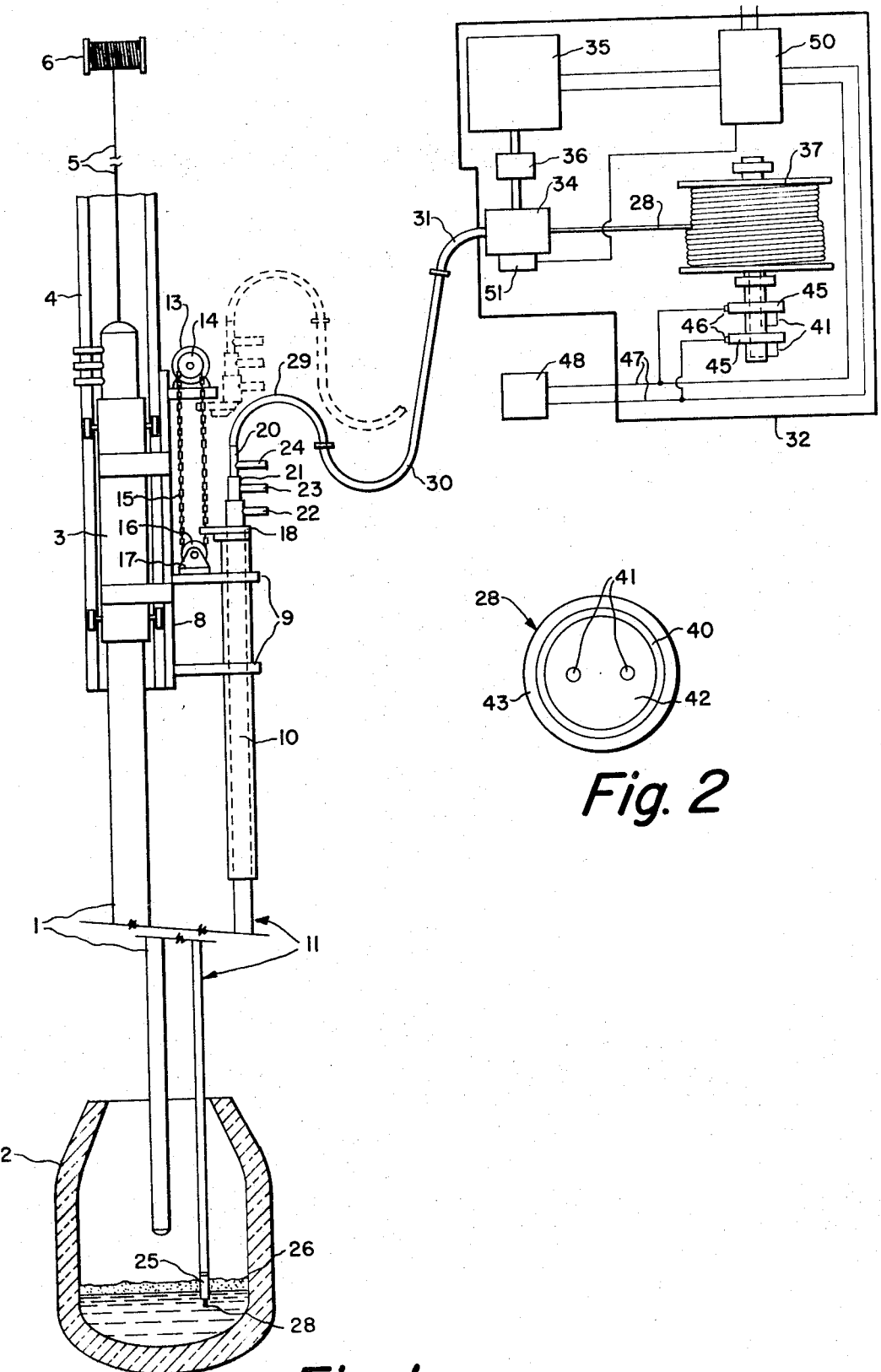

APPARATUS FOR CONTINUOUSLY MEASURING THE TEMPERATURE OF MOLTEN METAL

The invention described herein was made in the performance of work under a NASA contract and is subject to the provisions of Section 305 of the National Aeronautics and Space Act of 1958, Public Law 85–568 [72 stat. 435; 42 U.S.C. 2457]. The applicants have obtained a waiver (W-1,329).

This invention is concerned with the continuous measurement of the temperature of a body of molten metal, regardless of where that may be. It is especially applicable to basic oxygen furnaces, but may also be used with electric furnaces and open hearths. Likewise, this invention can be used in measuring the temperature of metal in the open-bottom mold of continuous casting apparatus. A further application relates to the pool of metal produced by a welding machine. In all of these applications the electric signal produced by the temperature measuring means may be used for control purposes of different kinds.

The measurement of the temperature of molten metal in a furnace by thermocouples has been an intermittent process heretofore. A thermocouple is immersed in the molten metal and a temperature reading is taken. The metal destroys the thermocouple, so the remnant has to be withdrawn from the furnace and a new thermocouple inserted before another reading can be taken. This requires considerable time and labor and, of course, periods of time elapse between successive readings. A suggestion has been made that two unconnected thermocouple wires be fed into the molten metal in a continuous manner at a rate determined by the dissolving of the wires by the metal. In this case, the molten metal itself forms the hot junction that connects the leading ends of the wires and causes them to function as a thermocouple. As far as we know, this idea has remained in the proposal stage because no suggestion has been made heretofore as to how the thermocouple wires could be fed into the metal at the correct rate.

It is among the objects of this invention to provide apparatus for measuring the temperature of molten metal continuously, which feeds a thermocouple into the metal at substantially the same rate as the thermocouple is consumed, which feeds the thermocouple at a rate controlled by the electric signal produced by the thermocouple itself, which registers temperature changes instantaneously and accurately, which permits the temperature of metal in a basic oxygen furnace to be measured during the oxygen blow period, and which provides a continuous electric signal by which the temperature of the metal can be controlled.

The invention is illustrated in the accompanying drawings, in which

FIG. 1 is a side view of the apparatus at two different scales, with the thermocouple feeding means shown diagrammatically;

FIG. 2 is an enlarged end view of the leading end of the thermocouple cable;

Figure 3:
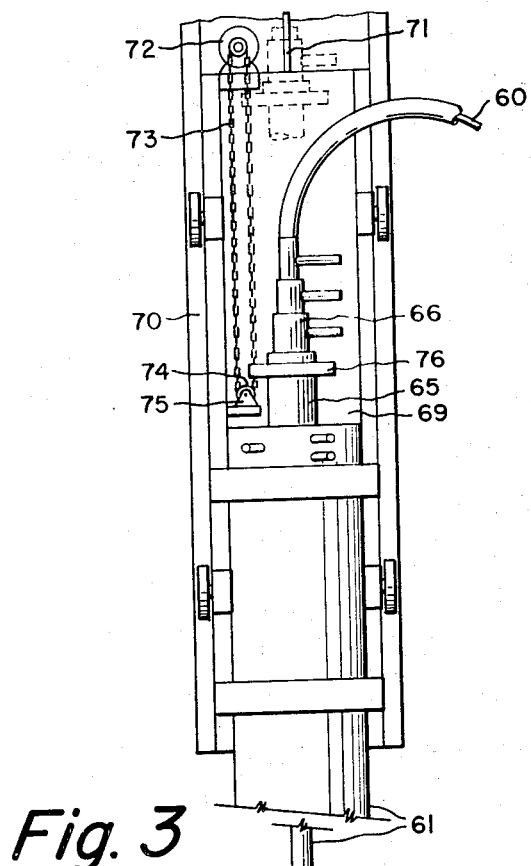
FIG. 3 is a view, similar to FIG. 1, of a modification.

Referring to FIG. 1 of the drawings, an oxygen lance 1 is shown extending down into a basic oxygen furnace 2 to operating position. The lance is supported at its upper end by a suitable carriage 3 that runs on a stationary vertical track 4 and that can be moved up and down by a cable 5 wound on a hoist 6 operated in any suitable manner. The furnace is supported in conventional manner so that it can be tilted for pouring while the lance is raised.

In accordance with this invention, the lance carriage also supports a vertical plate 8 or the like at one side of the track, from which vertically spaced arms 9 extend laterally and support a vertical guide sleeve 10. Slidably disposed in this sleeve is a long tubular element 11 that extends out of the top and bottom of the sleeve. Suitable means are provided for moving this element up and down in the sleeve. For example, a motor 13 may be mounted on a shelf projecting from the upper end of the vertical plate 8. The motor drives a sprocket 14 that is connected by a chain 15 to another sprocket 16 journalled in a bracket 17 on the arm 9 below it. The chain is attached to a collar 18 mounted for vertical adjustment on the tubular element so that when the motor is operated the chain can raise or lower the collar to raise or lower tubular element 11 in the guide sleeve. In its upper position, the lower end of the tubular element is generally located fairly close to the level of the lower end of the oxygen lance so that both can be lifted out of the furnace together by raising carriage 3.

The tubular element 11 is formed from concentric tubes, the inner one 20 of which has open upper and lower ends. The intermediate tube 21 forms with the inner and outer tubes a passage for cooling water that enters through an inlet 22 in the upper end of the outer tube and leaves through an outlet 23 in the upper end of the intermediate tube. The innermost tube is provided near its upper end with an inlet 24 for gas under pressure for a purpose that will be described presently. The lower end portion of the tubular element is formed by a replaceable relatively short refractory probe 25 that is screwed onto the lower end of the outer tube. The length of this probe is greater than the depth of the layer of slag 26 in the furnace so that the probe can extend above the slag and also project into the molten metal below it.

The tubular element 11 serves as a support, guide and positioner for a thermocouple cable 28 that extends down through the inner tube 20 and out of the lower end of the probe. Above the tube the cable extends through a rigid conduit 29 and a flexible conduit 30, the upper end of which is attached to the outer end of a rigid conduit 31 extending into a housing 32 that is mounted in a suitable location. This second rigid conduit terminates in the housing at a suitable cable feeding device 34 operated by a variable speed motor 35 through a gear reduction unit 36. This feeding device pulls the cable from a reel 37, on which it is wound, and feeds it into the conduit. The motor is shown as being an electric motor, but it could be another type, such as hydraulic or pneumatic.

Another feature of this invention is that the cable, as shown in FIG. 2, includes a flexible metal sheath 40, inside of which two laterally spaced thermocouple wires 41 are embedded in insulating material 42 that is highly resistant to high temperatures. Such a material may be $Al_2O_3$ or $MgO$, for example. The metal sheath is surrounded by a refractory coating 43 that is only partially fired until it enters the molten metal in the furnace, so that it remains flexible to permit the cable to be coiled on the reel. The cable can also be made in other ways, such as by individually insulated wires, each in its own metal sheath with the two sheaths connected by a metal web and all encased in a refractory coating. The wires may be made of tungsten-rhenium alloy, the melt rate of which can be held within acceptable limits by the ablative coating 43. The wires at the lower or leading end of the cable are not connected directly together as in the usual thermocouple. Instead, the molten metal in the furnace engages the exposed ends of the wires to electrically connect them and form the hot junction of the thermocouple.

The thermocouple wires leave the upper end of the cable and are led out of one side of the reel to slip rings 45 that engage contacts 46 connected by wires 47 to a suitable temperature indicating and/or recording device 48, by which the temperature of the metal in the furnace is registered. Wires 47 also lead to an electrically controlled motor speed control device 50 that may be a conventional servo system device, through which power is supplied for operating motor 35 that drives the cable feeding device 34. The speed control device is regulated by the electric signal supplied by the thermocouple. The greater the signal, the faster the operation of the motor. Preferably, there also is provided a counter 51 or encoder that is driven by the moving cable for feeding an electric signal back to the speed control device to help regulate its speed. The counter may also be connected to a device for indicating the position of the leading end of the cable relative to the lower end of the probe.

Before starting to use this apparatus, the probe 25 is held in its upper position relative to the oxygen lance and both are raised to the desired height above the furnace by means of hoist 6. The lower end of the thermocouple cable projects a few inches from the probe. After the furnace has been charged, carriage 3 is lowered on its track to lower both the lance and the probe into the furnace to a position four or five feet above the furnace charge. When the charge has been melted, the tubular element 11 is lowered in the guide sleeve 10 by the chain and sprockets to extend the refractory probe through the slag as shown in FIG. 1, with the lower end of the thermocouple cable projecting into the metal. The probe is oriented relative to the lance so that the probe will not be in the path of the oxygen jets issuing from the lance. The molten metal will form the hot junction between the lower ends of the thermocouple wires, whereby an electric signal will be generated that will register the temperature of the metal on the recorder 48. By prior tests, the rate at which the hot metal will consume the lower end of the cable at the desired temperature for the metal, such as 3,200° F, was determined and the motor speed control device 35 was set to feed the cable down through the probe at a rate that will substantially equal the rate at which the leading end of the cable is consumed at that temperature. The object of this is to maintain the lower end of the cable as nearly as possible at the same depth in the molten metal as it continues to read the temperature. While the temperature is being measured, the gas entering inlet 24 flows down around the cable and issues from the lower end of the probe with sufficient force to prevent metal from entering the probe around the cable.

In case the metal has not yet reached the desired temperature, the thermocouple will register a lower temperature and will therefore deliver a weaker signal to the speed control device, which will thereupon cause the feed motor 50 to operate at a slower speed so that the rate of feed of the cable likewise will be slower. This is desirable, of course, because at the lower temperature the cable is not consumed as fast as at the higher temperature. On the other hand, if the temperature of the metal exceeds the desired temperature, the thermocouple will deliver a stronger electric signal to the control device so that the cable feeding means will feed the cable faster to compensate for the faster rate of consumption of its lower end. Consequently, the cable can be made to travel downwardly at the proper speed proportional to the temperature, regardless of the temperature of the metal in the furnace, because the control signal continuously given by the thermocouple is determined by the temperature of the molten metal. In other words, the thermocouple not only continuously registers the temperature of the metal but it also automatically controls its own rate of feed. Of course, the thermocouple signal can also be used for additional purposes, such as for operating a computer that will control the supply of oxygen through the oxygen lance or for supplying heat to other types of furnaces.

For predictable processes, the servo speed control system can be replaced by a timer or preset programmer to drive the feed motor at appropriate speeds based on previous test experience.

Figure 4:
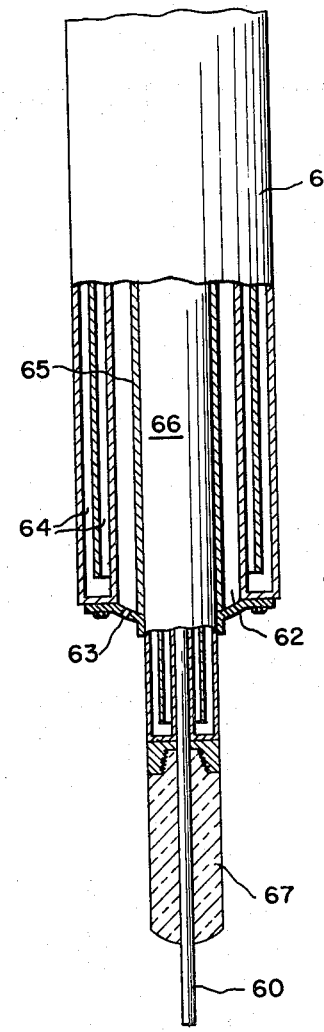
FIG. 4 is an enlarged fragmentary side view, partly in vertical section, of the lower end portion of the lance shown in FIG. 3.

In the modification shown in FIGS. 3 and 4, the thermocouple cable 60, instead of being located beside an oxygen lance, is fed down through the center of a specially constructed oxygen lance 61. As shown in FIG. 4, this lance has the usual central passage 62 for oxygen that is directed against the charge in the furnace at high pressure through nozzles 63 at the lower end of the lance. The oxygen passage is surrounded by the usual water cooling passages 64. However, the lance is modified to provide it with a central tube 65 so that it has a passage extending axially through it from end to end. Slidably mounted in this tube is a tubular element 66 like the one described before. The thermocouple cable extends down through this tubular element and out of the lower end of its refractory probe 67. The lance is attached to a suitable carriage 69 that can be moved up and down along a stationary vertical track 70 by means of a cable 71 suspended from a hoist above it. The carriage extends above the lance and may support at its top a motor 72 that drives a sprocket for a chain 73 that extends around a lower sprocket 74 journalled in a bracket 75 also supported by the carriage near the top of the lance. The chain is attached to a collar 76 adjustably mounted on the upper end portion of the tubular element 66. The chain slides the tubular element up or down in the lance when desired.

As in the first embodiment, the lance and tubular element 66 are lowered together into a furnace 78 by carriage 69, and at the proper time the tubular element is lowered relative to the lance to insert its refractory probe in the slag, with the lower end of the thermocouple cable located in the hot metal below the slag. The cable is fed down through the tubular element in the same manner as the one first described, the rate of feed being controlled automatically by the electric signal generated by the thermocouple in accordance with the temperature of the metal in the furnace.

Figure 5:
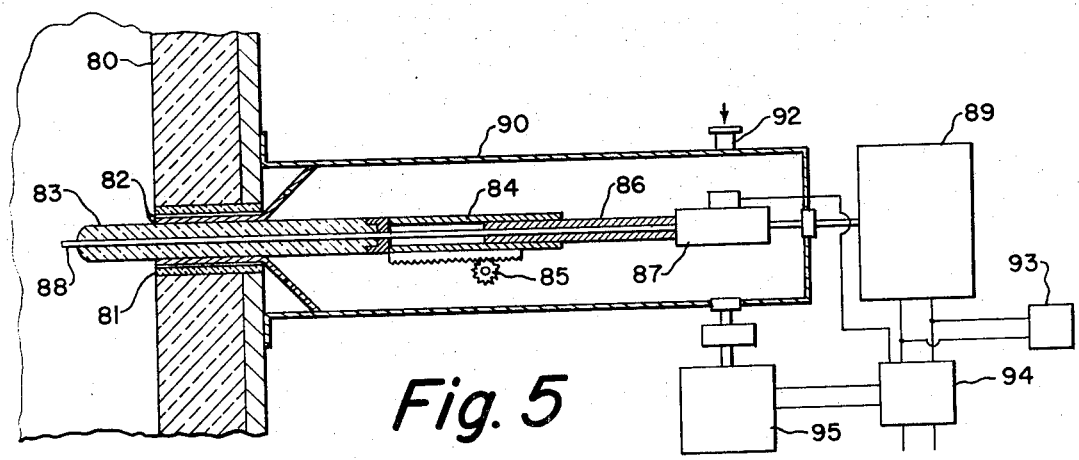
FIG. 5 is a horizontal fragmentary section of a further embodiment of the invention, with the thermocouple driving means shown diagrammatically.

It is also possible to insert such a thermocouple cable through a wall of a furnace, such as a side wall or bottom wall, in which case the cable does not pass through the slag. For example, as shown in FIG. 5, an opening may be formed in the side wall of the furnace 80 below the slag, and a sleeve 81 mounted in this opening. The outer end of the sleeve flares out to form a thermal shield. There are passages 82 between the sleeve and the surrounding wall of the opening for the passage of gas under pressure to keep the hot metal away from the opening. Slidably mounted in this sleeve is a tubular refractory probe 83, the outer end of which is detachably connected to a tube 84 that can be moved toward and away from the furnace by a rack and pinion 85 in order to project the probe into the furnace or to retract it therefrom. Telescoped within the outer end of the guide tube is another guide tube 86 that extends out to a suitable device 87 for driving a thermocouple cable 88 through the two tubes and the probe and out of the end of the probe within the furnace. This device pulls the cable from a reel 89 that may be located outside of the sealed housing 90 that encloses the elements described thus far. This housing is provided with an inlet 92 for the gas that flows through passages 82 at high velocity and that also flows through the probe to prevent hot metal from entering the end of the probe around the cable. The thermocouple wires at the reel are electrically connected to a temperature registering device 93 and to a speed control device 94 for the cable feeding motor 95 in the same way as described before. The temperature of the molten metal, through the thermocouple, therefore automatically determines the rate of feed of the thermocouple cable so that it will enter the furnace at substantially the same rate as the leading end of the cable is burned away. In furnaces where deep penetration by the cable is not required, the refractory probe 83 and its drive can be omitted.

In some cases, it may be found desirable to insert thermocouple cables into two or more locations in a furnace in order to read temperatures in different places at the same time. This can readily be done by lowering one cable into the top of the furnace and inserting another thermocouple cable through its side or bottom wall.

It will be understood from this disclosure that continuous temperature readings are taken by thermocouples that are fed into molten metal as fast as they are consumed by it, the feeding means being controlled by the electric signals produced by the thermocouples themselves. Also, these signals can be used not only for continuously indicating the temperature of the metal, but also for operating controls by which the melting process can be regulated.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Apparatus for continuously measuring the temperature of a body of molten metal, comprising a longitudinally movable cable containing a pair of laterally spaced thermocouple wires having exposed ends at the leading end of the cable, variable speed means for feeding the cable forward into said molten metal to thereby generate an electric signal in the cable, electric signal responsive control means operatively connected with said feeding means for controlling the speed thereof, means electrically connecting said thermocouple wires with said control means for regulation thereof to cause said feeding means to feed the cable into said molten metal at a rate that will substantially equal the rate at which the leading end of the cable is consumed by the molten metal, and means electrically connected with said thermocouple wires for continuously registering the temperature of said molten metal in response to said electric signal.

2. Apparatus as recited in claim 1, including a refractory coating on said cable.

3. Apparatus as recited in claim 1, in which said cable includes metal sheath means encircling said wires, insulating material surrounding the wires and filling the sheath means, and a refractory coating on the outside of the metal sheath means to retard melting thereof.

4. Apparatus as recited in claim 1, including a tubular element through which said cable is fed by said feeding means, and means for blowing a stream of gas through said element to prevent molten metal from entering the end adjacent the leading end of the cable.

5. Apparatus as recited in claim 1, including a vertical tube down through which said cable is fed by said feeding means, a refractory tubular member detachably connected to the lower end of said vertical tube, and means connected with said vertical tube for lowering said refractory member into a layer of slag on said molten metal.

6. Apparatus as recited in claim 5, including a support for said lowering means, and means for connecting said support to an adjacent vertically movable oxygen lance for vertical movement therewith.

7. Apparatus as recited in claim 6, including a vertical guide sleeve rigidly connected to said support, said vertical tube being slidably disposed in said sleeve.

8. Apparatus as recited in claim 1, including an oxygen lance provided with an axial passage therethrough, a tubular element slidably disposed in said passage and projecting from its opposite ends, and means for moving said element lengthwise of the lance, said cable extending through said tubular element.

9. Apparatus as recited in claim 1, including a sleeve adapted to be inserted in an opening through a wall of a metal melting furnace, said thermocouple cable extending through said sleeve, and means for blowing a stream of gas lengthwise of the sleeve to keep molten metal away from it.

10. Apparatus as recited in claim 9, including a refractory tubular member slidably mounted in said sleeve, said cable extending through said member in sliding relation therewith, and means for moving said member back and forth in said sleeve.

* * * * *